United States Patent
Lei et al.

(10) Patent No.: US 11,774,612 B2
(45) Date of Patent: Oct. 3, 2023

(54) DEVICE FOR MONITORING AND IDENTIFYING MOUNTAIN TORRENT AND DEBRIS FLOW AND METHOD FOR EARLY WARNING OF DISASTERS

(71) Applicant: Institute of Mountain Hazards and Environment, Chinese Academy of Sciences, Chengdu (CN)

(72) Inventors: Yu Lei, Chengdu (CN); Chuanzheng Liu, Chengdu (CN); Peng Cui, Chengdu (CN); Qiang Zou, Chengdu (CN)

(73) Assignee: Institute of Mountain Hazards and Environment, Chinese Academy of Sciences, Chengdu (CN)

( * ) Notice: Subject to any disclaimer, the term of this patent is extended or adjusted under 35 U.S.C. 154(b) by 0 days.

(21) Appl. No.: 17/828,052

(22) Filed: May 31, 2022

(65) Prior Publication Data
US 2022/0381931 A1    Dec. 1, 2022

(30) Foreign Application Priority Data
May 31, 2021    (CN) .......................... 202110603761.6

(51) Int. Cl.
*G01V 1/00*    (2006.01)
*G01V 1/22*    (2006.01)
(Continued)

(52) U.S. Cl.
CPC ............... *G01V 1/008* (2013.01); *G01V 1/22* (2013.01); *G01V 1/307* (2013.01); *G08B 21/10* (2013.01); *G08B 31/00* (2013.01)

(58) Field of Classification Search
CPC .......... G01V 1/008; G01V 1/22; G01V 1/307; G08B 21/10; G08B 31/00
(Continued)

(56) References Cited

U.S. PATENT DOCUMENTS

| 6,650,418 B2 * | 11/2003 | Tweedy ................. G01V 1/181 356/477 |
| 2015/0030098 A1 * | 1/2015 | Ljung .................... H04B 1/525 375/285 |

(Continued)

FOREIGN PATENT DOCUMENTS

| CN | 106710150 A * | 5/2017 |
| CN | 104680721 B    | 6/2017 |

(Continued)

OTHER PUBLICATIONS

English translation for CN 206430850, Aug. 22, 2017. (Year: 2017).*
(Continued)

*Primary Examiner* — Michael P Nghiem
(74) *Attorney, Agent, or Firm* — Bayramoglu Law Offices LLC

(57) ABSTRACT

A device for monitoring and identifying a mountain torrent and debris flow and a method for early warning of disasters relate to the technical field of debris flow protection. The device includes a computation device, sensors, an amplifier and an analog-to-digital converter. The sensors convert an acquired impact force signal into a digital signal by the amplifier and the analog-to-digital converter, and transmits the digital signal to the computation device. The computation device utilizes the digital signal to compute an energy coefficient of a liquid impact signal and a solid-liquid impact energy ratio, and a debris flow mode is monitored and identified in combination with a threshold range of the energy coefficient and a threshold range of the solid-liquid impact energy ratio. The device identifies the nature of the mountain torrent and debris flow through time-frequency analysis of an impact force signal generated by the debris flow to sensors.

4 Claims, 3 Drawing Sheets

(51) Int. Cl.
  *G01V 1/30* (2006.01)
  *G01V 1/13* (2006.01)
  *G08B 21/10* (2006.01)
  *G08B 31/00* (2006.01)

(58) Field of Classification Search
  USPC .......................................................... 702/15
  See application file for complete search history.

(56) References Cited

U.S. PATENT DOCUMENTS

2016/0020929 A1* 1/2016 Yamazaki ............... H04L 27/18
  375/300
2017/0269250 A1* 9/2017 Jin ........................ B06B 1/0611

FOREIGN PATENT DOCUMENTS

CN    206430850 U   *  8/2017
CN    111325948       *  6/2020

OTHER PUBLICATIONS

English translation for CN 106710150, May 21, 2017. (Year: 2017).*
English translation of CN 104680721, Jun. 13, 2017. (Year: 2017).*
English translation of CN111325948, Jun. 2020. (Year: 2020).*

* cited by examiner

DEVICE FOR MONITORING AND IDENTIFYING MOUNTAIN TORRENT AND DEBRIS FLOW AND METHOD FOR EARLY WARNING OF DISASTERS

CROSS REFERENCE TO THE RELATED APPLICATIONS

This application is based upon and claims priority to Chinese Patent Application No. 202110603761.6, filed on May 31, 2021, the entire contents of which are incorporated herein by reference.

TECHNICAL FIELD

The present invention relates to the field of debris flow protection, and in particular to a device for monitoring and identifying a mountain torrent and debris flow and a method for early warning of disasters.

BACKGROUND

The mountain torrent and debris flow are natural hazards having large energy and extremely strong destructive power, and the mountain torrent and the debris flow have different fluid natures, of which destruction modes, influences, control measures and disaster avoidance means are entirely different. It is an important content of prevention and control of the mountain area disaster and a premise of many engineering measures to determine whether the disaster is a mountain torrent or a debris flow in monitoring and early warning, and the formation of the scientific and reasonable monitoring means and accurate and timely prediction of the attribute of the disaster are important key contents of mountain torrent and debris flow prevention and control and disaster reduction and prevention.

The patent CN201510084442.3 disclosed a contact type device and system for monitoring motion parameters of a debris flow and a method for early warning of debris flow, and the device and system can efficiently obtain debris flow dynamic parameter comprehensive data and provide key dynamic parameters in real-time monitoring of the debris flow motion process, and the system for monitoring motion parameters of a debris flow, taking the contact type device for monitoring motion parameters of debris flow as the main body structure, can be arranged in a debris flow channel, can be practically arranged in a distributed mode according to terrain features of the channel, and can effectively obtain monitoring data, but does not classify the fluid type of the debris flow, so as to achieve fine monitoring, and further improve the sensitivity.

To sum up, a fine device for monitoring and identifying a mountain torrent and debris flow is urgently required, which can carefully classify the fluid type of the debris flow, thereby finely improving the sensitivity of the device for monitoring and identifying a mountain torrent and debris flow.

SUMMARY

In order to solve the above problem, the present invention provides a device for monitoring and identifying a mountain torrent and debris flow, which carefully classifies a fluid type of the debris flow and early warns a disaster type according to an actual situation.

One of the objectives of the present invention is to provide a device for monitoring and identifying a mountain torrent and debris flow. The specific technical solution is as follows:

the device for monitoring and identifying a mountain torrent and debris flow includes a computation device, sensors, an amplifier and an analog-to-digital converter, where the sensors convert an acquired impact force signal into a digital signal by means of the amplifier and the analog-to-digital converter, and transmits the digital signal to the computation device, the computation device utilizes the digital signal to compute an energy coefficient $e_l$ of a liquid impact signal and a solid-liquid impact energy ratio $r_{sl}$, and a debris flow mode is monitored and identified in combination with threshold ranges, where $$r_{sl} = \frac{e_s}{e_l},$$

$$e_l = \frac{\int_{f_{la}}^{f_{lb}} E(f)df}{\int_0^\infty E(f)df},$$

$e_s$ is an energy coefficient $$e_s = \frac{\int_{f_{sa}}^{f_{sb}} E(f)df}{\int_0^\infty E(f)df}$$

of a solid particle impact signal, and f is a frequency, where a feature frequency domain of a mud impact signal is $[f_{la}, f_{lb}]$, a feature frequency domain of particle impact is $[f_{sa}, f_{sb}]$, the feature frequency domain of the mud impact signal and the feature frequency domain of the particle impact are obtained by means of a field experiment or by monitoring data analysis, or by using empirical parameters, $f_{la}$ is a lower boundary value of a feature frequency domain range of the mud impact signal, $f_{lb}$ is an upper boundary value of the feature frequency domain range of the mud impact signal, $f_{sa}$ is a lower boundary value of a feature frequency domain range of the particle impact, $f_{sb}$ is an upper boundary value of the feature frequency domain range of the particle impact, and E(f) is an energy spectrum of a debris flow signal.

Preferably, the feature frequency domain of the mud impact signal is [0.05, 3], and the feature frequency domain of the particle impact is [300, 600].

Preferably, the debris flow mode is no impact and is marked as a first mode parameter when $e_l$ and $r_{sl}$ are not changed; the debris flow mode is a water flow and is marked as a second mode parameter when $e_l$ is greater than 0.98 and $r_{sl}$ is less than 5e-4; the debris flow mode is a mud flow and is marked as a third mode parameter when $e_l$ is greater than or equal to 0.95 and less than or equal to 0.98 and $r_{sl}$ is greater than or equal to 5e-4 and less than or equal to 5e-3; the debris flow mode is a debris flow and is marked as a fourth mode parameter when $e_l$ is greater than or equal to 0.65 and less than or equal to 0.95 and $r_{sl}$ is greater than or equal to 5e-2 and less or equal to 5e-3; the debris flow mode is a water-rock flow and is marked as a fifth mode parameter when $e_l$ is greater than or equal to 0.65 and less than or equal to 0.95 and $r_{sl}$ is greater than or equal to 5e-2 and less than or equal to 0.5; and the debris flow mode is a clastic flow and is marked as a sixth mode parameter when $e_l$ is less than 0.65, and $r_{sl}$ is greater than 1.0.

Preferably, the computation device encodes the digital signal for transmission by means of a radio signal.

Preferably, feature frequencies of the sensors are greater than 3 kHz.

Preferably, the sensors include a first sensor, a second sensor and a third sensor, where heights from the first sensor, the second sensor and the third sensor to an earth surface are $0.5h_1$, $0.7h_2$ and $0.8h_3$ respectively, $h_1$ is a perennial flow depth of a detected and identified ground, $h_2$ is a debris flow starting water depth of the monitored and identified ground, and $h_3$ is a is maximum water depth of the detected and identified ground in nearly 10 years.

Preferably, the sensors are cylinders having diameters ranging from 50 mm to 100 mm.

The second objective of the present invention is to provide a method for early warning of disasters, which utilizes the above device. The specific technical solution is as follows:

the method for early warning of mountain torrent and debris flow disaster utilizes the device in the above solution for early warning of the mountain torrent and debris flow disaster, a first sensor, a second sensor and a third sensor are mounted in a debris flow trench, stress surfaces of the sensors make forward contact with a debris flow to acquire an impact force signal, the sensors convert the acquired impact force signal into a digital signal by means of an amplifier and an analog-to-digital converter and transmits the digital signal to a computation device, the computation device utilizes the digital signal to perform time-frequency analysis, and performs information encoding on mode parameters generated by the sensors, and early warning of the disaster is performed according to the encoded information.

Further, an encoding process includes: identifying debris flow modes generated by the first sensor, the second sensor and the third sensor, marking corresponding mode parameters, numbering the mode parameters, and presetting disaster early warning information, where the disaster early warning information includes disaster-free early warning information, a mountain torrent level 2, a mountain torrent level 3, a mountain torrent level 1, a mud flow level 4, a mud flow level 3, a mud flow level 2, a mud flow level 1, a debris flow level 4, a debris flow level 3, a debris flow level 2, a debris flow level 1, a water-rock flow level 4, a water-rock flow level 3, a water-rock flow level 2, a water-rock flow level 1 and a clastic flow.

The present invention has the beneficial effects that the device of the present invention identifies the nature of the mountain torrent and debris flow through time-frequency analysis of the impact force signal generated by the debris flow to the sensors, and an early warning system constructs an effective early warning method on the basis of features of the method, which may rapidly identify the debris flow mode and more accurately determine the disaster type and level, thereby better dealing with the debris flow disaster.

The figures show 1-sensor, 11-first sensor, 12-second sensor, 13-third sensor, 2-support column, 3-earth surface, 4-concrete, 5-rebar, 6-signal and power pipeline and 7-debris flow trench.

DETAILED DESCRIPTION OF THE EMBODIMENTS

The present invention is further described in detail below by means of embodiments and drawings. It should be understood that the particular embodiments described herein are merely used to explain the present invention, and are not used to limit the present invention. Those skilled in the art should is understand that the details and forms of the technical solution of the present invention may be modified or replaced without departing from the structural idea and scope of use of the present invention, but these modifications and substitutions fall within the scope of protection of the present invention.

An empirical mode analysis based device for monitoring and identifying a mountain torrent and debris flow and a method of early warning of disasters, which are based on an early warning system to identify the nature of the mountain torrent and debris flow through time-frequency analysis of an impact force signal, and the early warning system is an effective early warning method constructed on the basis of features of the method.

Figure 1:
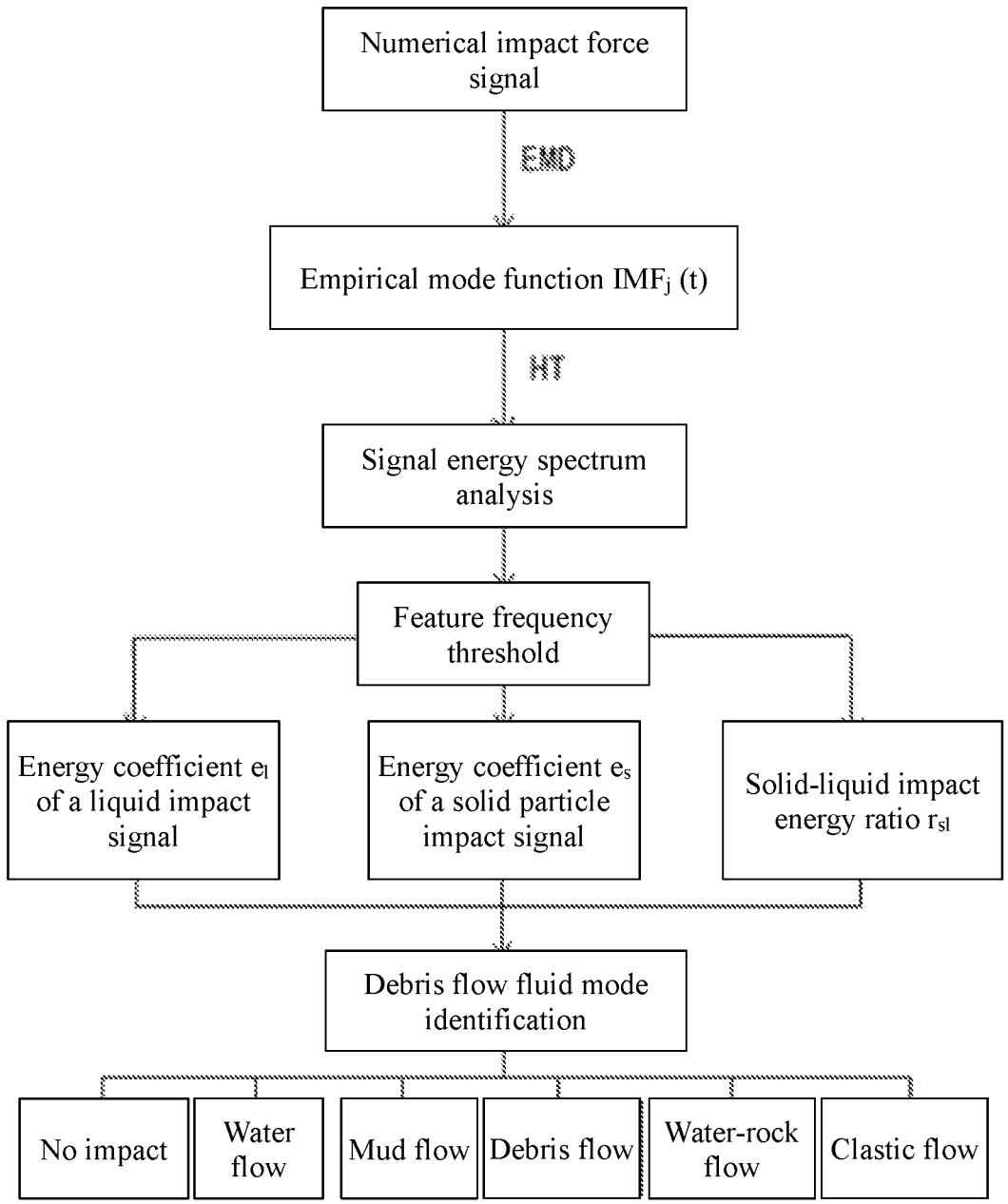
FIG. 1 is a basic flow chart of impact signal energy based debris flow mode identification of the present invention.

A basic process for identifying a debris flow mode based on energy distribution of an impact signal in different frequency bands is shown in FIG. 1. Firstly, a digital time sequence signal of an impact force of the debris flow is obtained by means of a pressure sensor 1 and a monitoring device, empirical mode decomposition (EMD) is carried out on impact force signals in previous $2\Delta t$ second time periods every $\Delta t$ seconds by means of a preprogrammed preprogram in a microprogrammed control unit (MCU) to obtain a plurality of empirical mode functions $IMF_j(t)$, (j=1, 2, 3 . . . n), and then Hilbert transform (HT) is carried out on the obtained empirical mode functions to obtain energy spectrum $E(f)$ of the signals, an impact force frequency spectrum of a general debris flow is shown as low-frequency impact of mud and high-frequency impact of particles, and therefore, a feature frequency domain $[f_{la}, f_{lb}]$ of a mud impact signal and a feature frequency domain $[f_{sa}, f_{sb}]$ of particle impact may be obtained according to a distribution rule of the energy spectrum on the frequency domain, thereby obtaining an energy coefficient $e_l$ of a debris flow liquid impact signal and an energy coefficient $e_s$ of a solid particle impact signal in the time period:

$$e_l = \frac{\int_{f_{la}}^{f_{lb}} E(f)df}{\int_0^\infty E(f)df}$$

$$e_s = \frac{\int_{f_{sa}}^{f_{sb}} E(f)df}{\int_0^\infty E(f)df}$$

so as to further obtain a solid-liquid impact spectrum energy ratio:

$$r_{sl} = \frac{e_s}{e_l}$$

In general, determination of the feature frequency domain of the debris flow impact signal may be obtained by means of a field experiment or by monitoring data analysis. When experimental conditions do not exist, empirical parameters, i.e., the feature frequency domain [0.05, 3] of the mud impact signal and the feature frequency domain [300, 600] of the particle impact, may be used.

By means of computation of a monitoring system computation device, the energy coefficient $e_l$ of the liquid impact signal of the impact force signal of fluid in a debris flow trench and the solid-liquid impact energy ratio $r_{sl}$ are obtained every $\Delta t$ time. Therefore, the mode and state of the debris flow in the trench are determined according to a threshold range shown in table 1. For example, when the energy coefficient $e_l$ of the liquid impact signal of the fluid is greater than 0.98 and the solid-liquid impact energy ratio $r_{sl}$ is less than 5e-4, the fluid in the trench is water.

TABLE 1

Debris Flow Mode Identification Table

| State | $e_l$ | $r_{sl}$ | Debris flow mode |
|---|---|---|---|
| 0 | — | — | No impact |
| 1 | >0.98 | <5e−4 | Water flow |
| 2 | 0.95−0.98 | 5e−4−5e−3 | Mud flow |
| 3 | 0.65−0.95 | 5e−2−5e−3 | Debris flow |
| 4 | | 5e−2−0.5 | Water-rock flow |
| 5 | <0.65 | >1.0 | Clastic flow |

Figure 2:
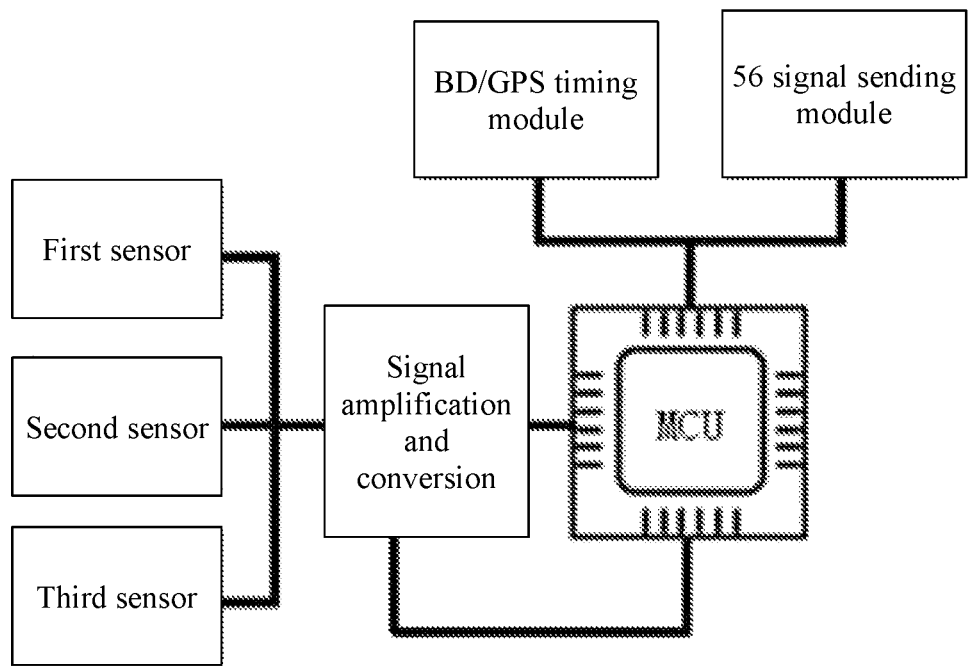
FIG. 2 is a structural schematic diagram of a principle of a device for monitoring and identifying a mountain torrent and debris flow of the present invention.

Necessary basic composition of the device of the present invention is shown in FIG. 2. The device mainly includes a computation device, sensors 1, an amplifier and an analog-to-digital converter, where the computation device, such as a micro control computer (MCU), mainly has the effects of acquiring, processing and analyzing signals, sending early warning information, controlling modules to work, etc. The 3 impact force sensors (a first sensor 11, a second sensor 12 and a third sensor 13) are used for acquiring debris flow impact signals at three different positions in space, the signals obtained by the sensors pass through the amplifier and the analog-to-digital converter, impact force models are converted into digital signals to be transmitted to the MCU, and in such a case, the MCU computes and analyzes the 3 signals by means of a preset program (computes an energy coefficient and an energy spectrum ratio and assigns debris flow mode parameters), analyzes debris flow disaster information according to the debris flow mode parameters of the three sensors, and sends early warning information codes (shown in Table 2) of the debris flow by means of a fifth generation (5G) signal terminal module. In order to ensure time precision, system time is obtained by means of a satellite timing module. A power supply may be supplied by means of any type of power supply module having an uninterruptible power supply (UPS) function.

Figure 3:
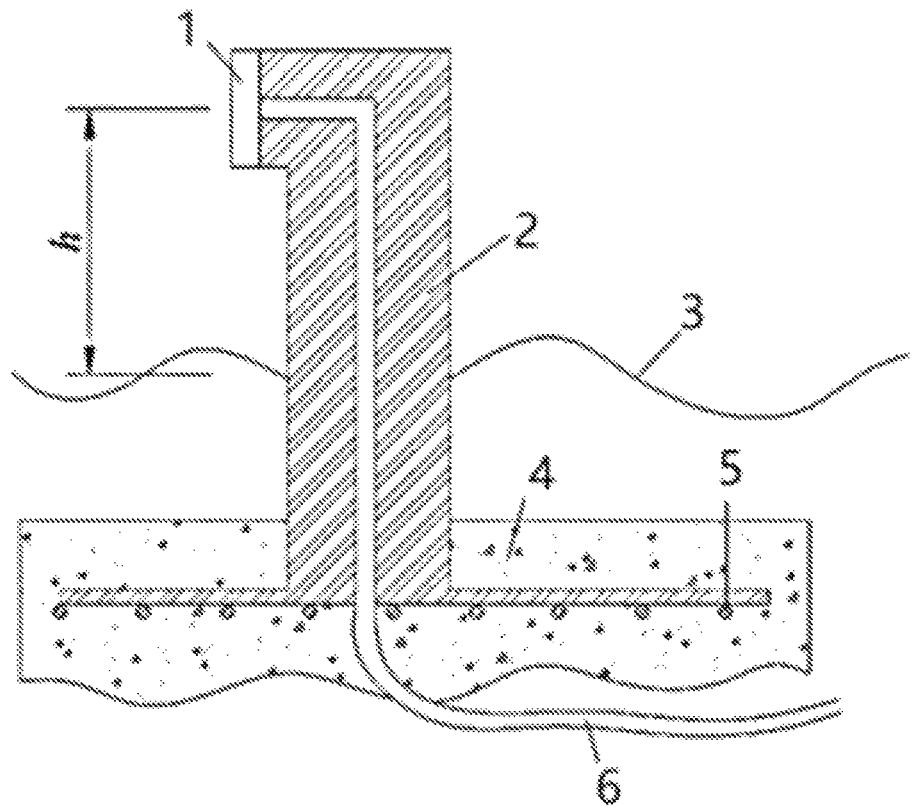
FIG. 3 is a structural schematic diagram of a sensor of the device for monitoring and identifying a mountain torrent and debris flow of the present invention.
Figure 4:
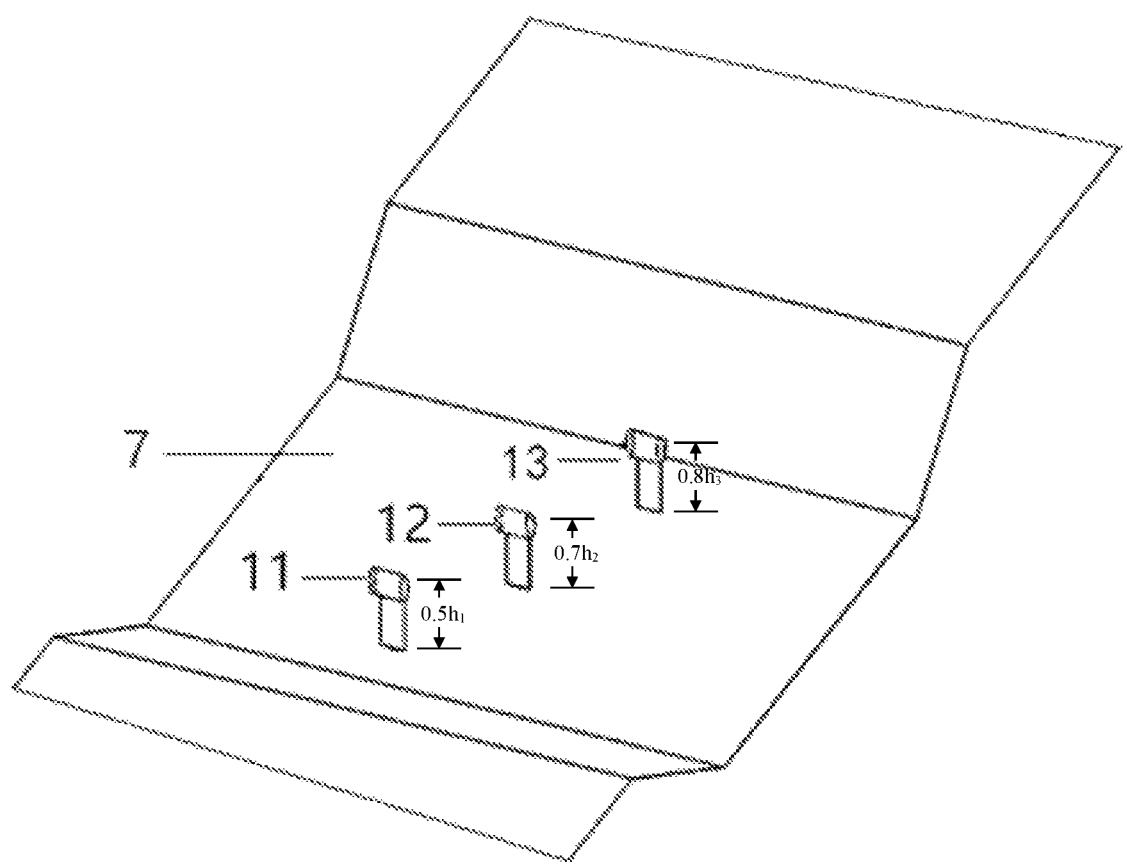
FIG. 4 is a mounting diagram of the device for monitoring and identifying a mountain torrent and debris flow of the present invention.

The basic structure and mounting of the pressure sensors are shown in FIG. 3, and the sensors are cylinders, one end of which serves as stress surfaces to directly face the debris flow. The sensors 1 are fixed on a support column 2, and the support column 2 is connected to a rebar 5 by means of a bottom steel plate and poured in concrete 4 located below an earth surface 3. The whole support column 2 is made of steel, and therefore, a feature frequency of the whole is vibration of the mounted and fixed pressure sensors and an auxiliary structure is remarkably greater than a signal frequency of an impact force of the debris flow (preferably greater than 3 kHz), and the pressure sensors and the auxiliary structure are waterproof and impact-resistant. Diameters d of the sensors 1 are not suitable for being too great or too small, and is generally suitable for ranging from 50 mm to 100 mm. Heights h between the mounted sensors and the earth surface are divided into three grades, and are determined mainly by investigating a perennial flow depth $h_1$, a debris flow starting water depth $h_2$ and a maximum water depth $h_3$ in nearly 10 years. FIG. 4 is field mounting schematic diagram of the device. The heights between the first sensor 11, the second sensor 12 and the third sensor 13 and the earth surface are configured to be $0.5h_1$, $0.7h_2$ and $0.8h_3$ respectively. A power supply and communication line of the sensors 1 is laid by burying a signal and power pipeline 6, and other modules are integrated on an erecting rod at a safe distance beside the debris flow trench 7.

TABLE 2

Debris Flow Disaster Early Warning Information Encoding

| | Sensor state parameters | | | Disaster early reference |
| Encoding | First sensor | Second sensor | Third sensor | information warning |
|---|---|---|---|---|
| X-0-0 | 0&1 | 0 | 0 | None |
| 1-0-1 | 1 | 0 | 1 | Mountain torrent |
| 1-1-0 | 1 | 1 | 0 | levels 2 and 3 |
| 1-1-1 | 1 | 1 | 1 | Mountain torrent level 1 |
| 2-0-0 | 2 | 0 | 0 | Mud flow level 4 |
| 2-0-1 | 2 | 0 | 1 | Mud flow level 3 |
| 2-1-0 | 2 | 1 | 0 | |
| 2-1-1 | 2 | 1 | 1 | Mud flow level 2 |
| 2-2-0 | 2 | 2 | 0 | |
| 2-X-2 | 2 | 0&1 | 2 | |
| 2-2-X | 2 | 2 | 0&1 | |
| 2-2-2 | 2 | 2 | 2 | Mud flow level 1 |
| 3-X-X | 3 | 0&1 | 0&1 | Debris flow level 4 |
| 3-2-1 | 3 | 2 | 1 | Debris flow level 3 |
| 3-1-2 | 3 | 1 | 2 | |
| 3-3-Y | 3 | 3 | 0&1&2 | Debris flow level 2 |
| 3-Y-3 | 3 | 0&1&2 | 3 | |
| 3-3-3 | 3 | 3 | 3 | Debris flow level 1 |
| 3-4-3 | 3 | 4 | 3 | |
| 3-3-4 | 3 | 3 | 4 | |
| 4-3-3 | 4 | 3 | 3 | |
| 4-X-X | 4 | 0&1 | 0&1 | Water-rock flow level 4 |
| 4-2-1 | 4 | 2 | 1 | Water-rock flow level 3 |
| 4-1-2 | 4 | 1 | 2 | |
| 4-4-Y | 4 | 4 | 0&1&2 | Water-rock flow level 2 |
| 4-Y-1 | 4 | 0&1&2 | 4 | |
| 4-3-4 | 4 | 3 | 4 | Water-rock flow level 1 |
| 4-4-3 | 4 | 4 | 3 | |
| 3-4-4 | 3 | 4 | 4 | |
| 4-4-4 | 4 | 4 | 4 | |
| 5-Y-Y | 5 | — | — | Clastic flow |

& is expressed as "or".

What is described above is merely a preferred embodiment of the present invention but not intended to limit the present invention, and any modifications, equivalent replacements, improvements, etc. made within the spirit and principles of the present invention should fall within the scope of protection of the present invention.

What is claimed is:

1. A device for monitoring and identifying a debris flow, comprising a computation device, sensors, an amplifier, and an analog-to-digital converter, wherein the sensors acquire an impact force signal, from the debris flow the impact force signal being amplified by the amplifier and converted into a digital signal by the analog-to-digital converter, and the digital signal is transmitted to the computation device, the computation device utilizes the digital signal to compute an energy coefficient $e_l$ of a liquid impact signal of the debris flow and a solid-liquid impact energy ratio $r_{sl}$, and a debris flow mode is monitored and identified in combination with a threshold range of the energy coefficient $e_l$ and a threshold range of the solid-liquid impact energy ratio $r_{sl}$, wherein $$r_{sl} = \frac{e_s}{e_l},$$

$$e_l = \frac{\int_{f_{la}}^{f_{lb}} E(f) df}{\int_0^\infty E(f) df},$$

$e_s$ is an energy coefficient of a solid particle impact signal $$e_s = \frac{\int_{f_{sa}}^{f_{sb}} E(f) df}{\int_0^\infty E(f) df},$$

of the debris flow, wherein a feature frequency domain range of a mud impact signal of the debris flow is $[f_{la}, f_{lb}]$, a feature frequency domain range of particle impact is $[f_{sa}, f_{sb}]$, the feature frequency domain range of the mud impact signal and the feature frequency domain range of the particle impact are obtained by a field experiment or by monitoring data analysis, $f_{la}$ is a lower boundary value of the feature frequency domain range of the mud impact signal, $f_{lb}$ is an upper boundary value of the feature frequency domain range of the mud impact signal, $f_{sa}$ is a lower boundary value of the feature frequency domain range of the particle impact, $f_{sb}$ is an upper boundary value of the feature frequency domain range of the particle impact, and E(f) is an energy spectrum of the debris flow;

wherein the debris flow mode is no impact and is marked as a first mode parameter when $e_l$ and $r_{sl}$ are not changed; the debris flow mode is a water flow and is marked as a second mode parameter when $e_l$ is greater than 0.98 and $r_{sl}$ is less than 5e-4; the debris flow mode is a mud flow and is marked as a third mode parameter when $e_l$ is greater than or equal to 0.95 and less than or equal to 0.98 and $r_{sl}$ is greater than or equal to 5e-4 and less than or equal to 5e-3; the debris flow mode is a debris flow and is marked as a fourth mode parameter when $e_l$ is greater than or equal to 0.65 and less than or equal to 0.95 and $r_{sl}$ is greater than or equal to 5e-2 and less than or equal to 5e-3; the debris flow mode is a water-rock flow and is marked as a fifth mode parameter when $e_l$ is greater than or equal to 0.65 and less than or equal to 0.95 and $r_{sl}$ is greater than or equal to 5e-2 and less than or equal to 0.5; and the debris flow mode is a clastic flow and is marked as a sixth mode parameter when $e_l$ is less than 0.65, and $r_{sl}$ is greater than 1.0;

wherein the computation device encodes the digital signal for transmission by a radio signal;

wherein feature frequencies of the sensors are greater than 3 kHz;

wherein the sensors comprise a first sensor, a second sensor and a third sensor, heights from the first sensor, the second sensor and the third sensor to an earth surface being $0.5h_1$, $0.7h_2$ and $0.8h_3$ respectively, $h_1$ being a perennial flow depth of a detected and identified ground, $h_2$ being a debris flow starting water depth of the detected and identified ground, and $h_3$ being a maximum water depth of the detected and identified ground in nearly 10 years.

2. The device according to claim 1, wherein the feature frequency domain range of the mud impact signal is [0.05, 3], and the feature frequency domain range of the particle impact is [300, 600].

3. The device according to claim 1, wherein the sensors are cylinders having diameters ranging from 50 mm to 100 mm.

4. A method for early warning a mountain torrent and debris flow disaster utilizing the device of claim 3, comprising: mounting the first sensor, the second sensor and the third sensor in a debris flow trench, wherein stress surfaces of the sensors make forward contact with a debris flow to acquire the impact force signal, the computation device utilizes the digital signal to perform time-frequency analysis, and performs information encoding on mode parameters generated by the sensors, and early warning of the debris flow disaster is performed according to encoded information.

* * * * *